Patented Nov. 17, 1925.

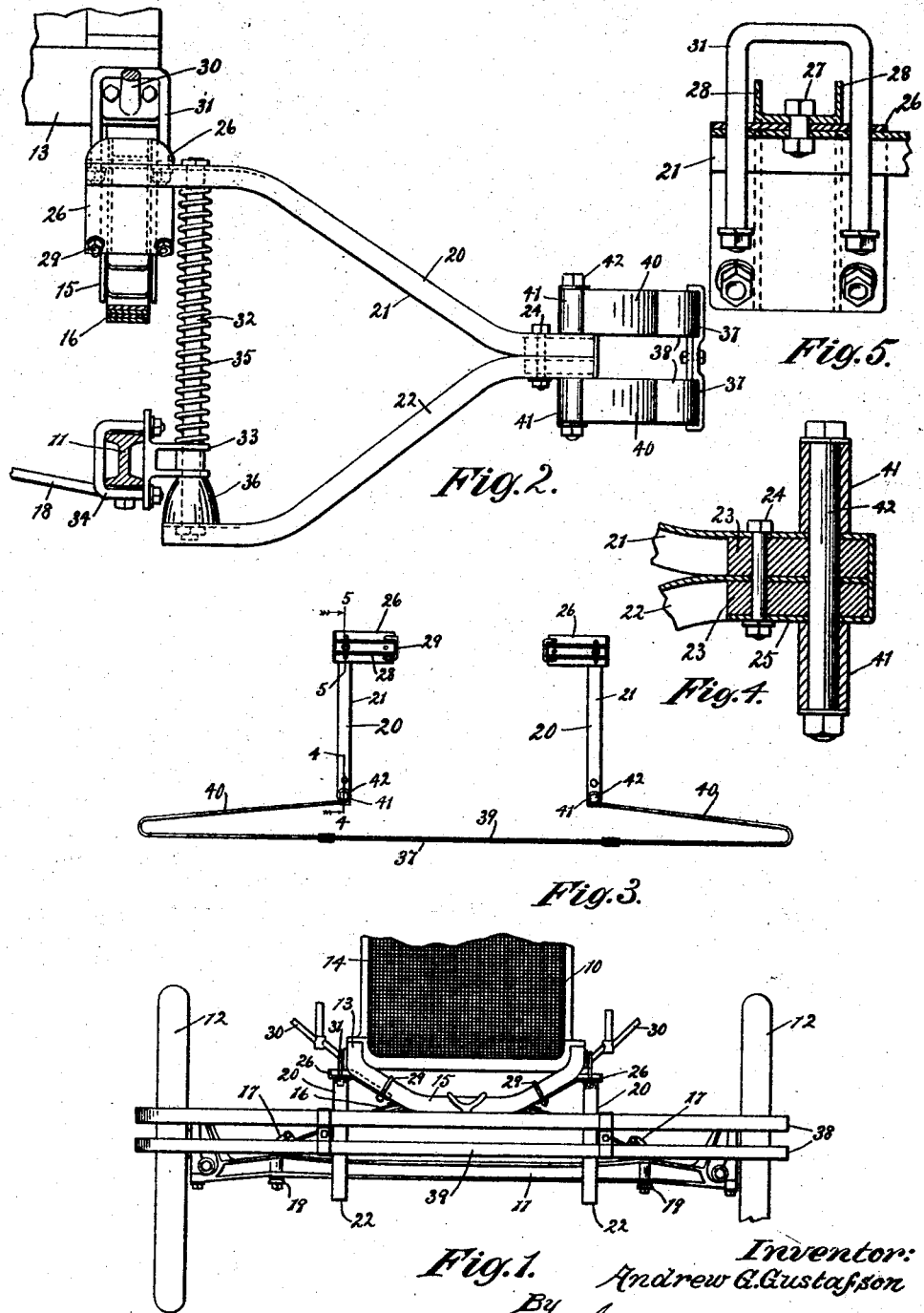

1,561,465

UNITED STATES PATENT OFFICE.

ANDREW G. GUSTAFSON, OF AURORA, ILLINOIS.

BUMPER-BAR ATTACHMENT.

Application filed October 5, 1923. Serial No. 666,711.

*To all whom it may concern:*

Be it known that I, ANDREW G. GUSTAFSON, a citizen of the United States, and resident of Aurora, county of Kane, and State of Illinois, have invented certain new and useful Improvements in Bumper-Bar Attachments, of which the following is a specification and which are illustrated in the accompanying drawings, forming a part thereof.

This invention relates to motor vehicles, and more particularly to bumper bar supports therefor.

One of the objects of the invention is the provision of new and improved means for supporting the bumper bar from the front end of motor vehicles.

Another object of the invention is the provision of a bumper bar support that will not only support the bumper bar but will also brace the front axle from fore and aft movement relatively to the frame.

Another object of the invention is the provision of a combined front axle brace and bumper bar support that is in the nature of a unitary attachment that may be secured to an automobile without modifying or changing the construction of the same, and that is cheap to manufacture, simple in construction, easily assembled, efficient in operation, and that is not likely to become broken or get out of order.

Other and further objects and advantages of the invention will appear from the following description, taken in connection with the accompanying drawings, in which Fig. 1 is a front elevation of a motor vehicle, with parts removed and parts broken away, showing the invention in position thereon;

Fig. 2 is a side elevation thereof with parts broken away and parts in section;

Fig. 3 is a plan view of the attachment;

Fig. 4 is a section on line 4—4 of Fig. 3;

Fig. 5 is a section on line 5—5 of Fig. 3.

Referring now to Figs. 1 to 5 inclusive, the numeral 10 designates a motor vehicle comprising the front axle 11, dirigible wheels 12 mounted thereon, and chassis frame 13 mounted on said axle and supporting the radiator 14 in the usual manner.

The chassis frame 13 is provided with the front U-shaped cross member or channel bar 15 in the channel of which a semi-elliptic spring 16 is adapted to be secured, as is usual in such constructions. The ends of the spring 16 are mounted on suitable spring perches 17 secured to said axle. The axle is held in proper position relatively to the spring by means of the V-shaped radius rod 18 the front ends of which are secured to the lower ends 19 of the spring perches 17 beneath the axle 11.

This arrangement for holding the axle in proper position is such that when the parts become slightly worn the axle is permitted to have a slight fore and aft movement. In traveling, especially with high speeds, when the front wheels encounter an obstruction, there is a tendency to bend or distort the radius rods 18, which are under compression, and thus cause a more or less displacement of the axle. In order to overcome these difficulties by providing additional bracing means for the axle which is also adapted to support a bumper bar, a construction has been provided which will now be described.

A support 20 is provided at each side of the car. Each support comprises rigid brace members 21 and 22 which may be and preferably are channel shaped in cross section. The front end of the brace members 21 and 22 may be secured together in any suitable manner. As shown, a block of wood or other suitable material 23 is placed in each channel and is secured therein by a bolt 24 which extends through said members and blocks and engages an angle member 25 the front end of which extends upwardly across the front ends of said members.

The rear end of the brace member 21 is adapted to be rigidly secured to the chassis frame. Any suitable means may be employed for this purpose. As shown, an angle plate 26 is rigidly secured to said brace member 21 by means of the bolt 27. The plate 26 may be and preferably is provided with longitudinally extending ribs 28 which are adapted to engage within the channels of the cross member 15 of the chassis frame. The ribs 28 may, if desired, be formed by attaching a channel bar to the plate 26, as shown in Fig. 3. The plate 26 is secured to the cross member 15 of the frame by U-shaped bolts 29. The outer end of the plate 26 is adapted to be attached to the fender support 30 by means of U-bolt 31 which extends through said plate and also through the brace member 21 of the support 20 and rigidly secures the same to said chassis frame.

Means are also provided for connecting the support 20 to the axle 11. Preferably this means is such that it will permit vertical movement of the axle relatively to the frame but will tend to prevent movement of the axle longitudinally of the frame. As shown, the rear ends of the brace members 21 and 22 are connected together by a rod 32. Slidably mounted on the rod 32 is a clip 33 which is adapted to be rigidly connected to the axle as by means of a U-bolt 34.

In order to prevent undue vibration of the spring 16 a coil spring 35 may be mounted on the rod 32 between the clip 33 and the support 20. A resilient member 36 of any suitable material, such as rubber, may be mounted on the rod 32 beneath said clip in order to check any undue rebound of the spring 16.

A bumper member 37 is adapted to be secured to the front ends of the supports 20. If desired, this member may be composed of two bars, 38, as shown in Figs. 1 and 2 of the drawing. Each one of these bars comprises a body portion 39 and rearwardly and inwardly extending arms 40 which may, if desired, be made integral with said body portion. The inner ends of the arms 40 are bent to form the eyes 41 to form attaching means, for said bar. One of the bars 38 is arranged above the support 20 and one below the same, and they are secured in position thereon by any suitable means such as the bolts 42. Arranging the arm 40 at an angle to the body portion 39 not only provides additional clearance for the front wheels 12 of the vehicle but also assists in disengaging the bar from objects with which it may come in contact in backing the car.

The attachment is in the form of a unitary construction that may be readily attached to the vehicle without modifying or making any change in the same.

In applying the device to an automobile it is only necessary to attach the attaching plates 26 to the chassis frame at each side thereof and to secure the clips 34 to the front axle of the vehicle.

While the device is shown as being adapted to be attached to a vehicle of a particular type it is understood that the use of the device is not so limited.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:

1. In combination, an axle, a chassis frame, means for resiliently mounting said frame on said axle, an upper brace member secured to said frame and extending forwardly therefrom, a lower brace member, a bumper bar, means for securing said bar to the forward ends of said brace members, a bar for connecting the rear ends of said members together, and means slidably engaging said bar for connecting said brace to said axle.

2. An attachment including a pair of supports each comprising an upper and a lower brace member, means for connecting said members together at their forward ends, a bumper bar secured to the forward ends of said supports, means for securing one of the members of each support to a chassis frame, a clip slidably connected to said support and means for securing said clip to the axle of a motor vehicle.

3. An attachment including a pair of rigid supports, a bumper bar secured to the forward ends of said supports, means for securing the rear ends of said supports to a chassis frame and to the axle of a motor vehicle, said means permitting relative movement between said frame and axle.

4. An attachment for motor vehicles including a pair of supports each comprising an upper and a lower rigid brace member, a bolt for securing the forward ends of said members together, a pair of bumper bars for engaging the ends of said bolts above and below said supports, means for rigidly connecting the upper brace member to the chassis frame of a motor vehicle, rods connecting the rear ends of said members together, clips slidably mounted on said rods and means for rigidly securing said clips to the axle of a motor vehicle.

5. In combination, a motor vehicle having an axle and a frame resiliently mounted thereon, a pair of bumper bar supports each comprising an upper and a lower brace member, means for connecting the forward ends of said members together, a rod secured between the rear ends of said members, a bumper bar connected to the forward ends of said members, means for rigidly connecting the rear ends of said upper brace members to said frame at each side thereof, a clip slidably connected to each rod, a resilient buffer member on each of said rods between said clip and said lower brace member, and means for rigidly securing said clips to said axle.

6. In a device of the class described, a pair of supports, each comprising two brace members diverging rearwardly, a bumper bar, means for connecting the forward ends of said members and bar together, a rod extending between the rear ends of said members, attaching plates rigidly secured to the upper of said brace members, clips slidably mounted on said rods, resilient means mounted on said rods above and below said clips.

ANDREW G. GUSTAFSON.